Sept. 26, 1961

C. BECK 3,001,715

AUTOMATIC DEAD RECKONING SYSTEM

Filed Aug. 29, 1957

INVENTOR.
CYRUS BECK

BY

ATTORNEYS

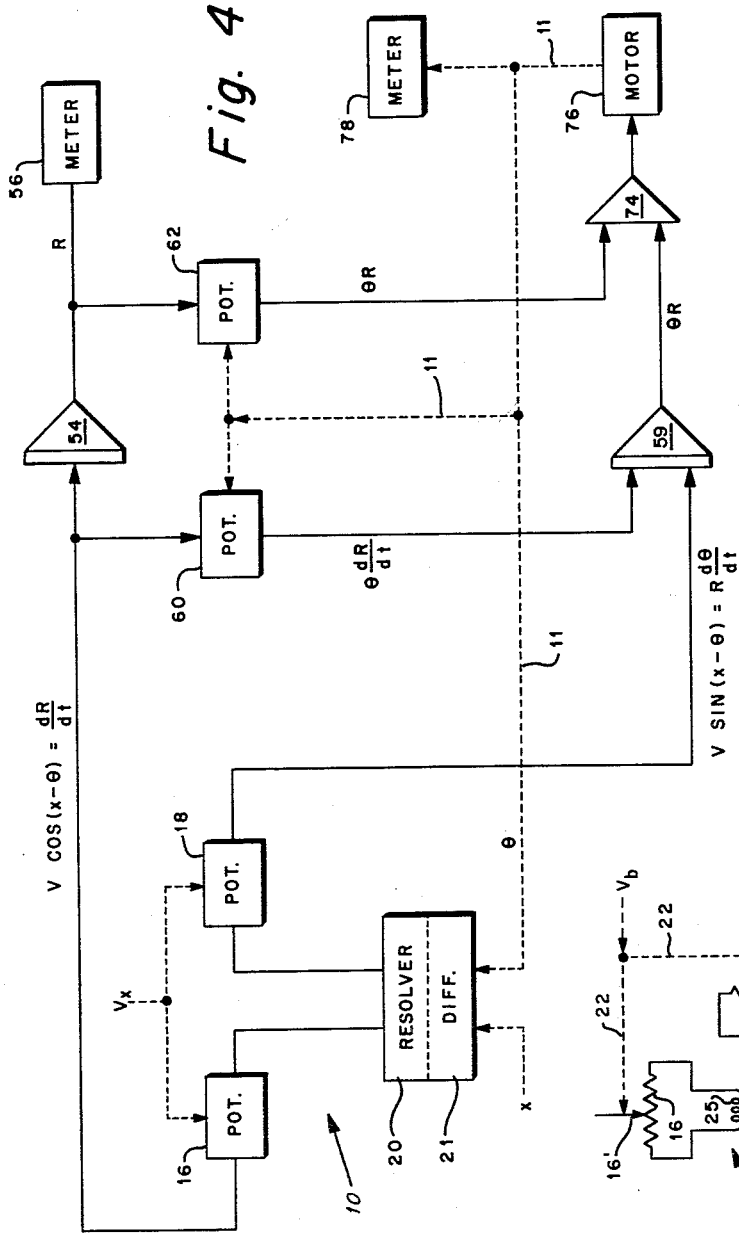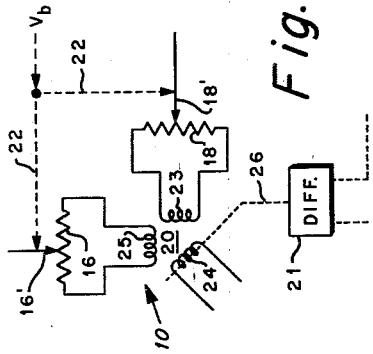

3,001,715
AUTOMATIC DEAD RECKONING SYSTEM
Cyrus Beck, 7756B Wagner Way, Elkins Park, Pa.
Filed Aug. 29, 1957, Ser. No. 681,144
10 Claims. (Cl. 235—186)
(Granted under Title 35, U.S. Code (1952), sec. 266)

The invention described herein may be manufactured and used by or for the Government of the United States of America for governmental purposes without the payment of any royalties thereon or therefor.

The present invention relates to an automatic dead reckoning system and more particularly to an automatic dead reckoning system in which the polar forms of the various velocity vectors are combined and integrated upon directly to compute instantaneous positional information.

Present arrangements for use aboard carrier-based aircraft to determine aircraft position relative to the carrier generally utilize techniques in which the various velocity vectors of carrier, wind, and aircraft are first resolved into their N-S and E-W components, added, and the sums of the components individually integrated and then converted back into the polar form by means of resolvers to give the instantaneous ground distance and direction or bearing of the airplane with respect to its carrier. These techniques require elaborate apparatus for accomplishing the resolution of the various vectors into their components and their recombination, and lead to undesirable inaccuracies as well as increased weight and cost.

The present invention overcomes the aforementioned disadvantages of prior arrangements by resorting to direct integration of the polar vectors without the intermediate steps of resolution and recombination. Based upon a succinct mathematical statement of the various vectors involved, a novel null-seeking analog computer is provided for receiving all of the various inputs and producing automatically the final distance vector completely defined for indicating the distance and angle between the moving craft and moving point of reference. The system, although particularly adaptable for use with an aircraft based on an aircraft carrier, can also be adapted for use wherever a plurality of vectors are to be combined and then integrated, or a single, varying vector is to be integrated.

It is an object of the present invention to provide apparatus for automatically computing from velocity vectors the ground distance and direction of an aircraft from a fixed or moving point of reference.

A further object is the provision of simple apparatus for solving and integrating a plurality of vectors without departing from their polar form.

Another object of the invention is the provision of apparatus for performing direct integration on a continuously varying vector in the polar form.

Other objects and features of this invention will become apparent from consideration of the following specification relating to the annexed drawings in which:

FIG. 3 shows one detail of the dead reckoning system of FIG. 2.

FIG. 4 illustrates a special case of the invention.

Figure 1:
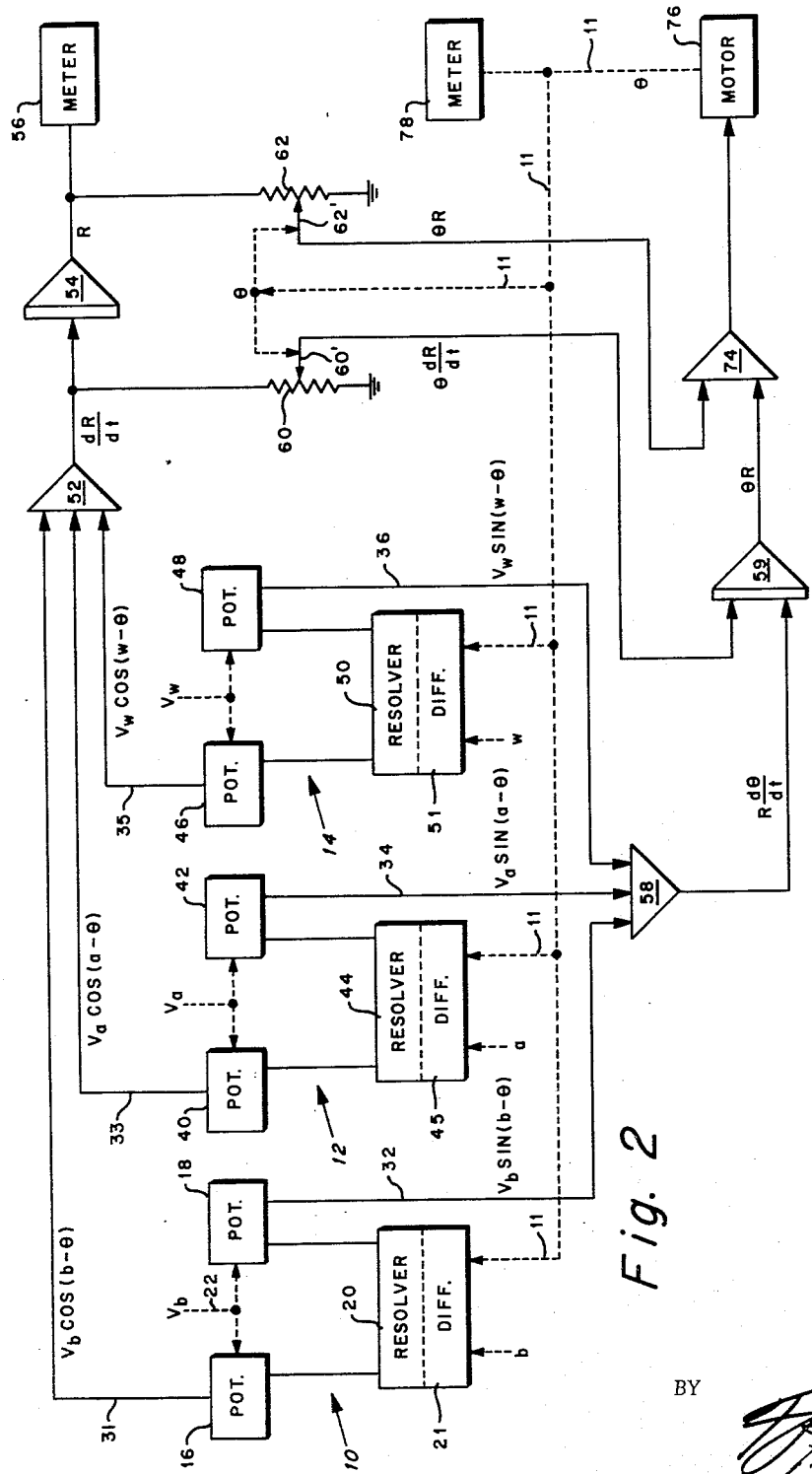
FIG. 1 shows a velocity vector diagram relating to an aircraft operating from a moving aircraft carrier.

When an aircraft departs from its carrier base, a vector diagram such as that shown in FIG. 1 illustrating speed and heading of the carrier $$(\vec{V_b})$$

wind velocity and direction $$(\vec{V_w})$$

and aircraft speed and heading $$(\vec{V_a})$$

will permit calculation of the closing vector $$(\vec{V_m})$$

representing the velocity of the aircraft relative to the aircraft carrier. If the closing vector is integrated continuously with respect to time beginning with the departure of the aircraft from the carrier, then there will be provided the total straight line distance between the carrier and the aircraft at any particular instant.

If a general vector of magnitude M having an associated angle A relative to some reference direction, such as north, is given by (1) $$\vec{M} = Me^{jA}$$

then by De Moivre's theorem, (2) $$e^{jA} = \cos A + j \sin A$$

Under the particular circumstances outlined above, $V_b e^{jb}$ = velocity vector of the moving carrier, where $b$ is the angle with respect to the reference direction;

$V_a e^{ja}$ = true airspeed vector, where $a$ is thhe angle with respect to the reference direction;

$V_w e^{jw}$ = wind speed vector, where $w$ is the angle with respect to the reference direction; and $V_m e^{jm}$ = closing or velocity of moving carrier relative to airplane from FIG. 1 at an angle $m$ to the reference direction.

Stated mathematically, the vector diagram of FIG. 1 is described as follows:

(3) $$V_b e^{jb} + V_a e^{ja} + V_w e^{jw} = V_m e^{jm}$$

in which terms $V_a e^{ja}$ and $V_w e^{jw}$ are negative.

If the distance vector from the airplane to the carrier is $Re^{j\theta}$, where R and $\theta$ are respectively the range and ground track angle from the aircraft to the carrier (4) $$V_m e^{jm} = \frac{d}{dt}(Re^{j\theta})$$

Substituting (3) into (4) gives (5) $$V_b e^{jb} - V_a e^{ja} - V_w e^{jw} = e^{j\theta}\frac{dR}{dt} + jRe^{j\theta}\frac{d\theta}{dt}$$

Dividing by $e^{j\theta}$ (6) $$V_b e^{j(b-\theta)} - V_a e^{j(a-\theta)} - V_w e^{j(w-\theta)} = \frac{dR}{dt} + jR\frac{d\theta}{dt}$$

Putting the left side of (6) in Cartesian from by utilizing the expansion of (2).

(7)
$V_b \cos(b-\theta) - V_a \cos(a-\theta) - V_w \cos(w-\theta)$
$\quad + jV_b \sin(b-\theta) - jV_a \sin(a-\theta) - jV_w \sin(w-\theta)$ $$= \frac{dR}{dt} + jR\left(\frac{d\theta}{dt}\right)$$

This yields, (8) $$V_b \cos(b-\theta) - V_a \cos(a-\theta) - V_w \cos(w-\theta) = \frac{dR}{dt}$$

and (9)
$$V_b \sin(b-\theta) - V_a \sin(a-\theta) - V_w \sin(w-\theta) = R\frac{d\theta}{dt}$$

Equations 8 and 9 plus the identity $$(10) \quad \int_0^t \left( R\frac{d\theta}{dt} + \theta\frac{dR}{dt} \right) dt = \theta R$$

provide the solution for R and $\theta$ desired.

Figure 2:
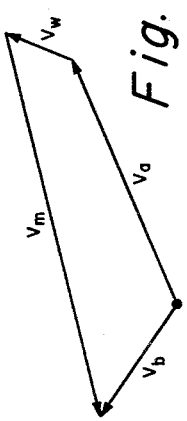
FIG. 2 illustrates schematically an automatic dead reckoning system according to the principles of this invention for application to the situation illustrated in FIG. 1.

An automatic dead reckoning system built according to the principles of this invention will solve Equations 8, 9, and 10, simultaneously. As illustrated in FIG. 2, the system includes the input units 10, 12 and 14 which are each designed to receive one of the various input parameters noted above. Each of the input units 10, 12, and 14 are interconnected by a mechanical linkage or coupling arrangement 11 which is schematically shown by dotted lines. For example, unit 10, which is shown more particularly in FIG. 3, consists of a pair of potentiometers 16 and 18 having wipers 16' and 18', respectively, a resolver 20, and a mechanical differential 21. Wipers 16' and 18' are positioned in unison by a connection 22 in accordance with carrier speed $V_b$ either manually by a dial (not illustrated) or some other automatic apparatus not forming a part of this invention. Resolver 20 consists of a pair of stationary, right angular secondary coils 23 and 25, and a rotatable primary coil 24 which is excited by some power source such as 400 c.p.s., 110 volts, as is understood in the art. Rotor 24 is positioned at $b-\theta$ by the output shaft 26 of differential 21 into which is fed shaft positions $b$ representing the heading of the carrier and $\theta$ representing the return heading of the aircraft to be determined by the illustrated system. Heading $b$, like speed $V_b$ of the carrier, may be manually or automatically supplied, while angle $\theta$ is fed back through a mechanical connection from elsewhere in the system, as described below.

Hence, it will be seen that wiper 16' on potentiometer 16 will pick off a voltage for line 31 having the magnitude $V_b \cos(b-\theta)$, while wiper 18' on potentiometer 18 will select a voltage for line 32 having the magnitude $V_b \sin(b-\theta)$.

Units 12 and 14 which are similarly constructed to accept the parameters dealing with airplane speed and heading, and wind speed and direction, respectively, produce on lines 33, 34, 35 and 36 the information indicated in FIG. 2. For this purpose, unit 12 consists of the potentiometers 40 and 42, a resolver 44, and a mechanical differential 45 while unit 14 consists of potentiometers 46 and 48, a resolver 50, and a mechanical differential 51.

The outputs $V_b \cos(b-\theta)$, $V_a \cos(a-\theta)$, and $V_w \cos(w-\theta)$ of potentiometers 16, 40 and 46, respectively, forming one side of Equation 8 are passed through the summing amplifier 52 to be combined in accordance with the signs given in Equation 8 to obtain the output voltage $$\frac{dR}{dt}$$

in accordance with this relationship. Of course, it is understood that the sign of each term is dependent upon whether the vector is to be added or subtracted in accordance with physical conditions, and that the inputs to the amplifiers are adjusted accordingly. The voltage $$\frac{dR}{dt}$$

which is proportional to the algebraic sum of all the components entering into the rate of change of the ground range R, is then passed into the integrator or integrating amplifier 54 for producing a signal representing R, which is the magnitude of the final vector or distance desired, as explained above, and energizes a voltage meter 56 for a direct indication of this value.

The outputs $V_b \sin(b-\theta)$, $V_a \sin(a-\theta)$, and $V_w \sin(w-\theta)$ from potentiometers 18, 42 and 48, respectively, forming the terms on one side of Equation 9, are passed to the summing amplifier 58 for producing the output voltage $$R\frac{d\theta}{dt}$$

which is passed to an integrator 59. The term $$R\frac{d\theta}{dt}$$

represents a voltage proportional to the algebraic sum of all the sine terms or components entering into the rate of change of the azimuth angle $\theta$.

A pair of potentiometers 60 and 62 are provided to receive across ground the outputs $$\frac{dR}{dt}$$

from amplifier 52 and R from integrator 54, respectively. Wipers 60' and 62' which are conjointly coupled mechanically to a motor 76 by linkage 11 to be interconnected by the mechanical coupling arrangement 11 and positioned in accordance with $\theta$ as hereinafter explained, thereby select the fractions $$\theta\frac{dR}{dt}$$

and $\theta R$ for inputs to integrator 59 and summing amplifier 74, respectively. Integrator 59 sums and integrates $$R\frac{d\theta}{dt} \text{ and } \theta\frac{dR}{dt}$$

as provided in Equation 10, while summing amplifier 74 accepts the output $\theta R$ from integrator 59 and mixes it in opposition to $\theta R$ from potentiometer 62. The output signal from amplifier 74 is therefore nulled when the inputs thereto from potentiometer 62 and integrator 59 are equal. Servo motor 76 is accordingly driven by the output of amplifier 74 in the direction of cancelling or nulling the input thereto by means of the mechanical coupling arrangement 11 to which it is drivingly connected. Hence, the whole system will stabilize itself at some null position and readjust itself continuously with changing conditions to maintain the shaft of motor 76 and hence the mechanical coupling 11 at some position representing angle $\theta$, which is recorded on a meter 78 that measures the angular displacement of the coupling 11 for view by the pilot or operator. It will be seen that the angle $\theta$ as indicated on meter 78 representing the heading or direction of vector R is the only value that will satisfy all the Equations 8, 9 and 10.

In the operation of the system described above, the operator would by manual or automatic means feed in the values of $V_b$, $V_a$, $V_w$ and angles $b$, $a$ and $w$, as noted above. The system thereafter would rebalance itself to a null position, motor 76 being driven by the output of amplifier 74 for this purpose. This establishes a stable value R and angle $\theta$, as indicated on meters 56 and 78, respectively. Of course, it is understood that the values of the vectors both magnitude and angularwise may be changed periodically either manually by the operator or automatically in accordance with other apparatus known in the art and not forming a part of this invention. Thus, at all times the values of R and $\theta$ would be available for indicating the instantaneous distance and bearing back to the carrier.

It is seen that the apparatus described above and illustrated in FIG. 2 provides for directly summing and integrating three vectors in their polar form. If two of the three vectors were reduced to, and maintained at zero, then the system would effectively provide for the continuous integration with respect to time of a variable velocity vector to obtain the total straight line distance between the origin and some point on the path taken by the vector. In this special case, much of the arrangement shown in FIG. 2 would be unnecessary, and the system would have the configuration illustrated in FIG. 4. Vector $V_x$ having a polar angle $x$ is the vector undergoing integration with respect to time. Unit 10 will deliver $$V \cos (x-\theta) = \frac{dR}{dt}$$

and $$V \sin (x-\theta) = R\frac{d\theta}{dt}$$

since the other additive terms of Equations 8 and 9 are zero. These signals are supplied directly to integrators 54 and 59, and potentiometer 60. The remainder of the system is identical to that shown in FIG. 2, with R and $\theta$ shown by meters 56 and 78, respectively.

Furthermore, without departing from the principles of this invention, the number of vectors or input parameters may be increased by adding units similar to 10, 12 and 14 to the configuration of FIG. 2 for each added vector. The signs of the various additive terms in Equations 8 and 9 would depend upon physical conditions necessitating that the summing amplifiers and integrators be connected to accomplish the adding and subtracting, as necessary. These components are well known in the art and may be selected to meet existing loads and conditions.

It is thus seen that applicant has provided not only novel navigational apparatus, but a unique servo system for general use in vector addition and simultaneous integration of the variety hereinbefore described.

It should be understood of course that the foregoing disclosure relates to only preferred embodiments of this invention and that numerous modifications or alterations thereof may be made therein without departing from the spirit and the scope of the invention as set forth in the appended claims.

What is claimed is:

1. A self-balancing servo system operating in response to a plurality of inputs each of which is a vector of particular magnitude and direction, comprising, in combination, servo motor means having a first shaft angular position, differential means for each of said vectors connected to said servo motor means and producing a second shaft angular position which is the algerbraic difference between the particular vector directions and said first shaft angular position, resolver means having input means connected to each said differential means for producing a pair of sine and cosine voltage outputs for each of said vectors as a function of each respective second shaft angular position, means multiplying each of said sine and cosine outputs by the magnitude of each respective vector producing a plurality of sine and cosine voltage terms and providing a proportional voltage output, means for summing each of said cosine terms and providing a proportional voltage output, means for summing each of said sine terms and providing a proportional voltage output, first integrator means for integrating the output of said cosine summing means, means also multiplying the output of said cosine summing means by said first shaft angular position producing a first output voltage, means multiplying the output of said first integrating means also by said first shaft angular position producing a second output voltage, second integrating means for integrating the sum of said first output voltage and the output of said sine summing means, and servo amplifier means for amplifying the difference between said second output voltage and the output of said second integrating means for driving said servo motor means in the direction of cancelling said difference.

2. A self-balancing servo system for integrating with respect to a function $t$ the polar vector having a magnitude $V$ and a direction $x$ both varying with respect to said function $t$, comprising, in combination: servo motor means having a null position $\theta$; means connected to said servo motor means for producing a pair of signal voltages $V \cos(x-\theta)$ and $V \sin(x-\theta)$; first potentiometer means for converting signal voltage $V \cos(x-\theta)$ into a voltage $\theta V \cos(x-\theta)$; first integration means for integrating with respect to function $t$, the sum of signal voltage ($V \sin(x-\theta)$ and $\theta V \cos(x-\theta)$ and obtaining a first voltage $\theta$R; second integrating means for integrating the signal voltage $V \cos(x-\theta)$ and obtaining a voltage R; second potentiometer means for converting signal voltage R into a second voltage $\theta$R; and servo amplifier means responsive to the difference between said first and second voltages $\theta$R and connected to and driving said servo motor means in the direction of reducing said difference to zero, said voltage R being the magnitude and $\theta$ the direction of the resultant vector after said integration.

3. A self-balancing servo system operating in response to a plurality of inputs each of which represents a vector of particular magnitude and direction, comprising, in combination, servo motor means having a shaft angular position, means including differential and resolver means for producing for each input vector a pair of sine and cosine voltage outputs as a function of the algebraic difference between the particular vector direction and said shaft output angular position multiplied by the magnitude of each respective vector and producing a plurality of sine and cosine voltage terms, said servo motor means being connected to said differential means, means for summing each of said cosine terms and providing a proportional voltage output, means for summing each of said sine terms and providing a proportional voltage output means for integrating and multiplying by said shaft angular position the output of said cosine summing means producing a first output voltage, means integrating the sum of the output of said sine summing means and the output of said cosine summing means, the latter output being first multiplied by said shaft angular position, said integrating means producing a second output voltage, and servo amplifier means for amplifying the difference between said first and second output voltages for driving said servo motor means in the direction of cancelling said difference.

4. A self-balancing servo system operating in response to a plurality of inputs each of which is a vector of particular magnitude and direction, comprising, in combination, servo motor means having a shaft angular position, means including differential and resolver means for producing for each input vector a pair of sine and cosine voltage outputs as a function of the algebraic difference between the particular vector direction and said shaft output angular position multiplied by the magnitude of each respective vector and producing a plurality of sine and cosine voltage terms, said servo motor means being connected to said differential means, means for summing each of said cosine terms and providing a proportional voltage output, first integrator means for integrating the output of said cosine summing means, means also for multiplying the output of said cosine summing means by said shaft angular position producing a first output voltage, means multiplying the output of said first integrating means also by said angular position producing a second output voltage, second integrating means for integrating the sum of said first output voltage and the output of said sine summing means, and servo amplifier means for amplifying the difference between said second output voltage and the output voltage of said second integrating means for driving said servo motor means in the direction of canceling said difference.

5. A self-balancing servo system operating in response to a plurality of inputs each of which is a vector of particular magnitude and direction, comprising, in combination, servo motor means having a first shaft angular position, means including differential means producing for each of said vectors a second shaft angular position which is the algebraic difference between the particular vector direction and said first shaft angular position, said servo motor means being connected to said differential means, resolver means having input means connected to said differential means for producing for each of the latter means a pair of sine and cosine voltage outputs as a function of each respective second shaft output angular position multiplied by the magnitude of each respective vector and producing a plurality of sine and cosine voltage terms, means for summing each of said cosine terms and providing a proportional voltage output means for summing each of said sine terms and providing a proportional voltage output means for integrating and multiplying by said first shaft angular position the output of said cosine summing means producing a first output voltage, means integrating the sum of the output of said sine summing means and the output of said cosine summing means multiplied by said first shaft angular position producing a second output voltage, and servo amplifier means for amplifying the difference between said first and second output voltages for driving said servo motor means in the direction of canceling said difference.

6. A self-balancing servo system operating in response to a plurality of inputs each of which is a vector of particular magnitude and direction, comprising, in combination, servo motor means having a first shaft angular position, differential means connected to said servo means and producing for each of said vectors a second shaft angular position which is the algebraic difference between the particular vector direction and said first shaft angular position, receiver means connected to said differential means for producing for each of the latter means a pair of sine and cosine voltage outputs as a function of each respective second shaft angular position, means multiplying each of said sine and cosine outputs by the magnitude of each respective vector and producing a plurality of sine and cosine voltage terms, means for summing each of said cosine terms and providing a proportional voltage output means for summing each of said sine terms and providing a proportional voltage output, first integrator means for integrating the output of said cosine summing means, means also multiplying the output of said cosine summing means by said first shaft angular position producing a first output voltage, means multiplying the output of said first integrating means also by said first shaft position producing a second output voltage, second integrating means for integrating the sum of said first output voltage and the output of said sine summing means, and servo amplifier means for amplifying the difference between said second output voltage and the output voltage of said second integrating means for driving said servo motor means in the direction of canceling said difference.

7. A self-balancing servo system operating in response to a plurality of inputs each of which is a vector of particular magnitude and direction, comprising, in combination, servo motor means having a first shaft angular position, a plurality of differential means connected to the output shaft of said servo motor means, means producing for each of said vectors a second shaft angular position which is the algebraic difference between the particular vector direction and said first shaft angular position, resolver means each having a rotor driven by one of said differential means for producing for each of the latter means a pair of sine and cosine voltage outputs as a function of each respective second shaft output angular position, potentiometer means multiplying each of said sine and cosine outputs by the magnitude of each respective vector and producing a plurality of sine and cosine voltage terms, means for summing each of said cosine terms and providing a proportional output voltage means for summing each of said sine terms, and providing a proportional output voltage, first integrating means for integrating the output of said cosine summing means, means also multiplying the output of said cosine summing means by said first shaft angular position producing a first output voltage, means multiplying the output of said first integrating means also by said first shaft angular position producing a second output voltage, second integrating means for integrating the sum of said first output voltage and the output of said sine summing means, and servo amplifier means for amplifying the difference between said second output voltage and the output of said second integrating means for driving said servo motor means in the direction of cancelling said difference.

8. A self-balancing servo system for combining a plurality of independently variable vectors each characterized by a magnitude V and a direction represented by $x$ with respect to a reference direction and integrating the resultant thereof to produce a final vector of determined magnitude and direction, comprising, in combination, servo motor means having a null shaft angular position $\theta$, resolver and differential means for each of said vectors operating on inputs V, $x$, and said null shaft position $\theta$ for producing a first output voltage $V \cos(x-\theta)$ and a second output voltage $V \sin(x-\theta)$ for each of said vectors, said differential means being connected to said servo motor means; means for receiving said first output voltages and producing a voltage $$\frac{dR}{dt}$$

representative of the sums of said first output voltages of said vectors; means for receiving said second output voltages and producing a voltage $$R\frac{d\theta}{dt}$$

representative of the sums of said second output voltages of said vectors; means for multiplying said voltage $$\frac{dR}{dt}$$

by an electrical quantity representative of angle $\theta$ and producing a voltage $$\theta\frac{dR}{dt}$$

representative of the product of voltages representative of $$\frac{dR}{dt}$$

and $\theta$; first integrator means for integrating said voltages $$R\frac{d\theta}{dt} \text{ and } \theta\frac{dR}{dt}$$

and delivering a first voltage $\theta R$; second integrator means for operating on said voltage $$\frac{dR}{dt}$$

and producing a voltage R representative of the magnitude of the final vector means for multiplying said voltage R by an electrical quantity representative of angle $\theta$ and producing a second voltage designated as $\theta R$; and servo amplifying means for amplifying the difference between said first and second voltages $\theta R$ and driving said servo motor and said differential means in the direction of reducing said difference to zero and balancing at said null shaft position $\theta$.

9. A self-balancing servo system operating in response to a plurality of inputs of each of which is a vector of particular magnitude V and direction $x$, comprising, in combination, servo motor means having an instantaneous shaft angular position $\theta$, differential means connecting to said servo motor means and means producing for each of said vectors a shaft output angular position which is the algebraic difference between $\theta$ and $x$, resolver means responsive to the latter said angular position for producing for each vector a pair of sine and cosine voltage outputs $V \sin (x-\theta)$ and $V \cos (x-\theta)$, means for summing each of said cosine terms and providing a proportional voltage output, means for summing each of said sine terms and providing a proportional voltage output, means for integrating and multiplying by an electrical quantity representative of the angle $\theta$ the output of said cosine summing means producing a first output voltage designated as $\theta R$, means integrating the output of said sine summing means and the output of said cosine summing means multiplied by an electrical quantity representative of the angle $\theta$ for producing a second output voltage also designated as $\theta R$, and servo amplifier means for amplifying the difference between said first and second output voltages for driving said servo motor means in the direction of cancelling said difference.

10. A dead reckoning navigational system for computing the straight-line distance and direction of an aircraft relative to a moving reference point comprising, in combination: servo motor means having a null shaft angle position $\theta$; differential and resolver means responsive to reference point heading $b$, reference point speed $V_b$, and $\theta$ for producing a pair of output voltages $V_b \cos (b-\theta)$ and $V_b \sin (b-\theta)$; differential and resolver means responsive to wind direction W, wind speed $V_w$, and $\theta$ for producing a pair of output voltages $V_w \cos (w-\theta)$ and $V_w \sin (w-\theta)$; differential and resolver means responsive to aircraft heading $a$, aircraft speed $V_a$, and $\theta$ for producing a pair of output voltages $V_a \cos (a-\theta)$ and $V_a \sin (a-\theta)$; all of said differential means being connected to said servo motor means; first summing means for summing the output voltages $V_b \cos (b-\theta)$, $V_a \cos (a-\theta)$, and $V_w \cos (w-\theta)$ for producing an output voltage designated as $$\frac{dR}{dt}$$

second summing means for summing the output voltages $V_b \sin (b-\theta)$, $V_a \sin (a-\theta)$, and $V_w \sin (w-\theta)$ for producing an output voltage designated as $$R\frac{d\theta}{dt}$$

first integrating means for integrating said voltage $$\frac{dR}{dt}$$

with respect to time and producing a voltage R proportionate to the distance between the aircraft and the moving reference point; means also separately multiplying said output voltage $$\frac{dR}{dt}$$

by an electrical quantity representative of the angle $\theta$ and producing a first voltage designated as $R\theta$; means for summing an integrating $$R\frac{d\theta}{dt} \text{ and } \theta\frac{dR}{dt}$$

and producing a second voltage also designated as $\theta R$; and servo amplifier means for amplifying the difference between said first and second voltages $\theta R$ for driving said servo motor means in the direction of cancelling said difference, said voltage R representing said straight-line distance and $\theta$ the direction thereof.

References Cited in the file of this patent
UNITED STATES PATENTS 2,536,495     Ewing _____ Jan. 2, 1951

OTHER REFERENCES

Electronic Instruments (Rad. Lab., vol. 21), by Greenwood et al., McGraw-Hill, New York, 1954.

Control Engineering, vol. 1, No. 3, November 1954 ("31 Ways to Multiply," by S. A. Davis), pp. 45 and 46 relied on.

UNITED STATES PATENT OFFICE
CERTIFICATE OF CORRECTION

Patent No. 3,001,715                  September 26, 1961

Cyrus Beck

It is hereby certified that error appears in the above numbered patent requiring correction and that the said Letters Patent should read as corrected below.

Column 2, line 29, for "thhe" read -- the --; line 56, for "from" read -- form --; column 8, line 70, strike out "of", first occurrence; line 73, for "connecting" read -- connected --.

Signed and sealed this 14th day of August 1962.

(SEAL)
Attest:

ERNEST W. SWIDER
Attesting Officer

DAVID L. LADD
Commissioner of Patents